United States Patent [19]

Franklin, Jr.

[11] 4,385,899
[45] May 31, 1983

[54] UNIVERSAL JOINT

[75] Inventor: Leonard N. Franklin, Jr., Reese, Mich.

[73] Assignee: General Motors Corporation, Detroit, Mich.

[21] Appl. No.: 182,865

[22] Filed: Sep. 2, 1980

[51] Int. Cl.³ .............................................. F16D 3/02
[52] U.S. Cl. .................................... 464/146; 464/906
[58] Field of Search ............... 64/21, 8; 464/146, 145, 464/142, 143, 906

[56] References Cited

U.S. PATENT DOCUMENTS

| | | | |
|---|---|---|---|
| 2,046,584 | 7/1936 | Rzeppa | 64/21 |
| 2,309,939 | 2/1943 | Dodge | 64/21 |
| 3,218,827 | 11/1965 | Aucktor | 64/21 |
| 3,442,095 | 5/1969 | Devos | 64/21 |
| 3,452,558 | 7/1969 | Cull et al. | 64/21 |
| 3,464,232 | 9/1969 | Hutchinson | 64/21 |
| 3,603,111 | 9/1971 | Aucktor | 64/21 |
| 3,815,381 | 6/1974 | Wagner | 64/21 |
| 4,027,927 | 6/1977 | Turner | 64/21 |
| 4,034,576 | 7/1977 | Takahashi et al. | 64/21 |
| 4,068,499 | 1/1978 | Sharp | 64/21 |

FOREIGN PATENT DOCUMENTS

| | | | |
|---|---|---|---|
| 2736140 | 2/1979 | Fed. Rep. of Germany | 64/21 |
| 579940 | 11/1977 | U.S.S.R. | 64/21 |

*Primary Examiner*—Tony M. Argenbright
*Assistant Examiner*—Magdalen Moy
*Attorney, Agent, or Firm*—F. J. Fodale

[57] ABSTRACT

A universal joint comprises inner and outer drive members with longitudinal drive grooves which receive drive balls for transferring torque between the members. The balls are positioned by a cage which is pivoted on the inner and outer drive members about two respective centers which are on opposite sides of and spaced from the cage center. The cage has a cylindrical surface and two stop surfaces inside the cage which permits the inner drive member to slide and pivot with respect to the cage for limited distance which in turn provides either a limited plunge or a limited plunge of reduced resistance.

6 Claims, 4 Drawing Figures

UNIVERSAL JOINT

This invention relates generally to universal joints and, more particularly, to a universal joint of the general type having inner and outer drive members with longitudinal drive grooves, drive balls in the drive grooves for transferring torque between the drive members, and a cage for positioning the drive balls which is pivoted on the inner and outer drive members, about two respective centers which are on opposite sides of and spaced from the cage center.

Particular kinds of such universal joints are known from U.S. Pat. No. 2,046,584 (Rzeppa)—FIG. 4; U.S. Pat. No. 3,442,095 (Devos) and U.S. Pat. No. 3,464,232 (Hutchinson). The universal joints disclosed in these patents operate on the double offset principle; that is, the cage is pivoted by reason of inner and outer partispherical surfaces of the cage whose respective centers lie on the longitudinal axis of the cage on opposite sides of and spaced equal distances from the cage center so that the cage positions the drive balls in the homokinetic plane for constant velocity operation at all joint angles.

In the universal joint according to the FIG. 4 of U.S. Pat. No. 2,046,584 (Rzeppa), the inner drive member is fixed axially in the cage which in turn is fixed axially in the outer drive member. Consequently, the cage prevents axial movement between the inner and outer drive members and the universal joint is known as a fixed center double offset joint.

The universal joints according to U.S. Pat. No. 3,442,095 (Devos) and U.S. Pat. No. 3,464,232 (Hutchinson) also have inner drive members which are fixed axially in the cage. The cage, however, slides and pivots in a cylindrical surface of the outer drive members to permit axial movement between the drive members. These universal joints, which are known as plunging double offset joints, have a high resistance to plunging movement because the inner drive member is fixed axially in the cage and the drive balls skid when the cage slides in the outer drive member.

This high resistance to plunging movement has been recognized in U.S. Pat. No. 3,452,558 (Cull et al) and U.S. Pat. No. 4,027,927 (Turner). These patents propose to eliminate ball skidding over at least a portion of the plunging movement by use of a separate guide ring which is fixed axially in the cage and which is slidably mounted on the inner drive member. The universal joints disclosed in these patents also operate on the double offset principle.

It is also known from U.S. Pat. No. 3,218,827 (Aucktor)—FIG. 1 to provide a spacing 13 between an outer partispherical surface 12 of an inner joint member 1 and an inner partispherical surface 14 of a cage 10 in a universal joint. According to the Aucktor patent, the spacing 13 facilitates the start of gliding displacement between the inner and outer drive members 1 and 5. The spacing principle reportedly has been applied to the plunging double offset joint disclosed in aforementioned Devos and Hutchinson patents to provide a limited rolling plunge.

Consequently, to date all known and reported attempts to reduce ball skidding in a plunging joint of the general type under consideration have always adhered strictly to the principle of the inner and outer partispherical surfaces of the cage being maintained on centers which lie on the longitudinal axis of the cage on opposite sides of and spaced equal distances from the cage center.

The object of my invention is to provide a limited plunge or a limited plunge of reduced resistance in a universal joint of the general type under consideration; that is, one which has a cage for positioning the drive balls which is pivoted on the inner and outer drive members about two respective centers which are on opposite sides of and spaced from the cage center.

This is achieved by providing a cylindrical surface and two stop surfaces inside the cage so that the inner drive member slides for a limited distance as well as pivots in the cage. This feature provides limited plunge when the cage is fixed axially in the outer drive member and a limited plunge of reduced resistance when the cage is slidable in the outer drive member.

Another feature of my invention is that the universal joint does not require separate guide rings for the cage as in the universal joints proposed in the aforementioned Cull et al and Turner patents.

Another feature of my invention is the inner drive member engages the inside of the cage at all times and thus the cage at least assists in centering the inner drive member in the outer drive member.

Still another feature of my invention is that the stop surfaces inside the cage can be configured to a high conformity to the inner drive member which reduces stress and wear on these components, particularly when the inner drive member operates at either end of its stroke in the cage.

Still yet another feature of my invention is that it provides a greater amount of stroke in comparison to the spacing proposed in the aforementioned Aucktor patent for the same cage thickness and thus cage strength. Also the radial control of the inner drive member is not sacrificed.

Other objects and features of the invention will become apparent to those skilled in the art as the disclosure is made in the following detailed description of a preferred embodiment of the invention as illustrated in the accompanying sheets of drawing in which.

Figure 1:
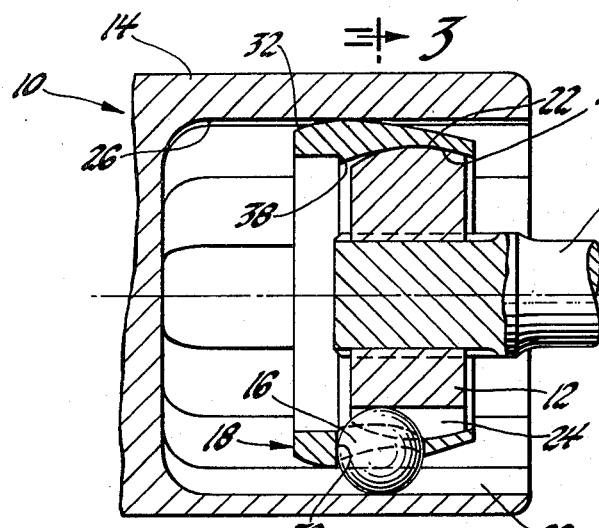
FIG. 1 is a longitudinal section, of a universal joint in accordance with this invention taken substantially along the line 1—1 of FIG. 3 looking in the direction of the arrows. The joint is shown with the inner drive member at one end of its stroke in the cage.

Referring now to the drawing, the universal joint 10 comprises an inner drive member 12, an outer drive member 14, six circumferentially spaced drive balls 16 and a cage 18.

The inner drive member 12 is splined to a shaft 20 which can be either an input shaft or an output shaft. The inner drive member 12 has an outer partispherical surface 22 and six equally circumferentially spaced drive grooves 24 which are parallel to the longitudinal axis of the inner drive member 12.

The outer drive member 14 has an inner cylindrical surface 26 and six equally circumferentially spaced drive grooves 28 which are parallel to the longitudinal axis of the outer drive member 14.

Each of the six drive balls 16 is disposed in a respective one of the drive grooves 24 and a respective one of the drive grooves 28 for transferring torque between the drive members 12 and 14. Six drive balls 16, drive grooves 24 and drive grooves 28 have been illustrated because this is the usual number. However, a greater or lesser number of drive balls and corresponding pairs of drive grooves may be used.

The cage 18 is located between the drive members 12 and 14 and it has a plurality of circumferentially spaced pockets 30 which receive the drive balls 16.

The ball pockets 30 are spaced so that the drive balls 16 have a running clearance in the axial direction and have their centers maintained in a common plane P which intersects the longitudinal axis A of the cage 14 to define the cage center O. The ball pockets 30 are elongated in the circumferential direction so that the drive balls 16 can move circumferentially with respect to the cage 18 when the universal joint is bent at an angle.

The cage 18 has an outer partispherical surface 32 which has a center B which lies on the cage axis A to one side of and spaced a distance from the cage center O. The partispherical surface 32 engages the cylindrical surface 26 of the outer drive member 14 so that the cage 14 slides as well as pivots in the outer drive member as in the universal joints described in the aforementioned Devos and Hutchinson patents. The cage 18 also has a frustoconical surface 34 at the smaller end. This is an optional feature which is disclosed in the Hutchinson patent for increasing cage thickness at the smaller end and limiting joint angle.

The cage 18 has an inner surface 36 which engages the outer partispherical surface 22 of the inner drive member 12. This surface comprises a partispherical surface 38 which merges into an intermediate cylindrical surface 40 which in turn merges into another partispherical surface 42 at the other end. The cylindrical surface 40 is concentric to the cage axis A and it engages the outer partispherical surface 22 of the inner drive member 12 with a sliding fit so that the inner drive member 14 slides as well as pivots in the cage 18 between the end positions shown in FIGs. 1 and 2 where the cage 18 engages the partispherical surfaces 42 and 38 respectively. The partispherical surfaces 38 and 42 have spaced centers C and D which lie on the cage axis A spaced from the cage center O to the side opposite that of center B for the outer partispherical surface 32. The center C lies nearer to the cage center O than the center B while the center D lies farther away.

It is possible to have other shapes for the partispherical surfaces 38 and 42 so long as these surfaces permit the inner drive member 12 to slide between the centers C and D and establish the end pivot centers C and D.

However, it is preferable to use partispherical surfaces and moreover partispherical surfaces which have the same diameter as the cylindrical surface 40 so that there is a high degree of conformity between the partispherical surfaces 38 and 42 and the outer partispherical surface 22 of the inner drive member. This reduces the stress and wear on the cage 18 and inner drive member 12 when they engage at the end positions shown in FIGS. 1 and 2.

A universal joint in accordance with this invention does not conform to the double offset principle because the cage 18 does not establish two equally offset pivot centers for the cage. More particularly, the cage 18 does not establish the pivot center shown at B' in FIG. 4. Consequently, velocity variations are introduced when the joint is bent at an angle and rotated. At first it might seem preferable to space the centers C and D equidistant from the center B'. However, it is preferable to bias the centers C and D away from the cage center O to increase the funnel angle. Consequently, the center C is preferably located closer to the center B' than the center D is. For instance, in an actual sample of the universal joint shown in the drawing which has been built and successfully tested, the centers C and D were placed about 3.0 mm apart with the center C about 1 mm from the center B' and the center D about 2 mm or twice as far therefrom.

Figure 2:
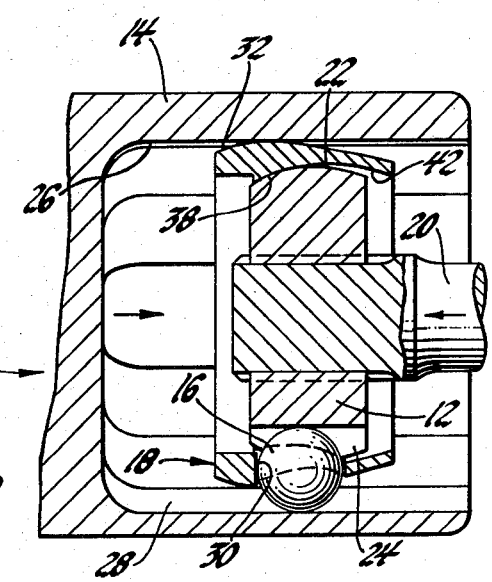
FIG. 2 is a longitudinal section showing the universal joint of FIG. 1 with the inner drive member at the other end of its stroke.
Figure 3:
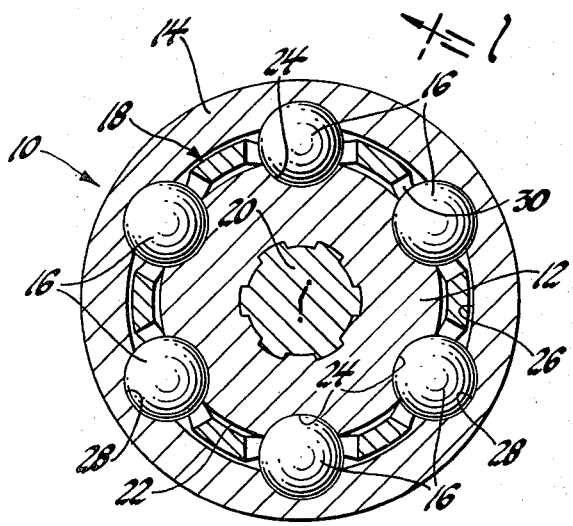
FIG. 3 is a section taken substantially along the line 3—3 of FIG. 1 looking in the direction of the arrows.

In operation, the universal joint 10 shown in the drawing has a limited reduced resistance plunge which is made possible by the inner drive member 12 sliding in the cage 18 as the cage 18 slides in the outer drive member 14. This axial sliding freedom of the cage 18 with respect to both drive members permits the drive balls 16 to roll rather than skid in the drive grooves 24 and 28. The limits of the reduced resistance plunge are shown in FIGS. 1 and 2. In FIG. 1, the inner drive member 12 is against the surface 42 of the cage 18. From this position the inner drive member 12 is free to slide to the left to the position shown in FIG. 2 where the inner drive member is against the surface 38. During this movement the cage 18 is also free to slide in the outer drive member 14 and consequently the drive balls 16 roll in the drive grooves 24 and 28. Further plunge is accommodated in conventional manner by the cage 18 sliding in the outer drive member 14 and the drive balls skidding in the drive grooves 24 and 28. When the plunge is reversed; that is, toward the right, the universal joint again has a reduced resistance plunge until the inner drive member 12 engages the surface 42.

During the reduced resistance plunge, the inner drive member 12 is radially located in the cage 18 which in turn is radially located in the outer drive member 14. Consequently, the cage 18 centers or at least assists the drive balls 16 in centering the inner drive member 12 in the outer drive member 14 at all times.

At the reduced resistance plunge limits, the inner drive member 12 engages one of the partispherical surfaces 38 or 42 which have a high conformity to the inner drive member 12. Thus, the high thrust forces associated with a further sliding plunge do not produce high stresses in the inner drive member 12 and the cage 18 or cause excessive wear.

While the universal joints of this invention violate the double offset principle, the introduction of velocity variations is more than compensated for by the limited reduced resistance plunge feature.

Figure 4:
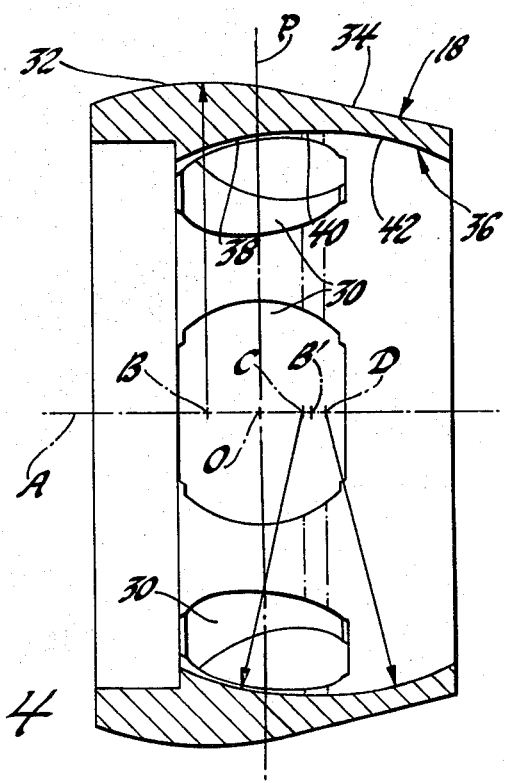
FIG. 4 is an enlarged longitudinal section of the cage shown in FIGS. 1, 2 and 3.

My invention has been illustrated in connection with a plunging type universal joint because the advantages are more fully realized in such a joint. However, my invention is also applicable to a fixed center type of joint such as shown in FIG. 4 of the Rzeppa patent, if a limited plunge is desired in such a joint. When my invention is applied to this type of joint, the drive balls skid during plunge since the cage is axially fixed in the outer drive member.

I wish it to be understood that I do not desire to be limited to the exact details of construction shown and described, for obvious modifications will occur to a person skilled in the art.

The embodiments of the invention in which an exclusive property or privilege is claimed are defined as follows:

1. In a universl joint having inner and outer drive members with longitudinal drive grooves, drive balls in the drive grooves for transferring torque between the drive members and a cage for positioning the drive balls which is pivoted on the inner and outer drive members about two respective centers which are on opposite sides of and spaced from the cage center, the improvement comprising said cage having a cylindrical surface and two axially spaced stop surfaces inside the cage, and said inner member slideably engaging the cylindrical surface and being moveable axially and pivotally thereon with respect to the cage between two pivot centers established by the inner member engaging the respective stop surfaces.

2. In a universal joint having inner and outer drive members with longitudinal drive grooves, drive balls in the drive grooves for transferring torque between the drive members and a cage for positioning the drive balls which is pivoted on the inner and outer drive members about two respective centers which are on opposite sides of and spaced from the cage center, the improvement comprising:

said cage having a cylindrical surface and two axially spaced stop surfaces inside the cage and said inner member slideably engaging the cylindrical surface and being moveable axially and pivotally along the axis of the cage between two pivot centers established by the inner member engaging the respective stop surfaces, said pivot centers lying on the axis of the cage spaced from the cage center and on the opposite side of the cage from the center about which the cage pivots on the outer drive member.

3. In a universal joint having inner and outer drive members with longitudinal drive grooves, drive balls in the drive grooves for transferring torque between the drive members and a cage for positioning the drive balls which is pivoted on the inner and outer drive members about two respective centers which are on opposite sides of and spaced from the cage center, the improvement comprising said cage having a cylindrical surface and two axially spaced curved surfaces inside the cage and said inner member slideably engaging the cylindrical surface and being moveable axially and pivotally along the axis of the cage between two pivot centers lying on the axis of the cage on the side of the cage center opposite from the center about which the cage pivots on the outer drive member, one of said pivot centers lying closer to the cage center than the aforementioned center and the other of said pivot centers lying farther away.

4. The improvement as defined in claim 3 wherein the one pivot center lies closer to an imaginary center (which is on opposite side of and equidistance from the center about which the cage pivots on the outer member) than the other pivot center.

5. The improvement as defined in claim 3 wherein the curved surfaces are partispherical and axially spaced centers lying on the axis of the cage.

6. In a universal joint having inner and outer drive members with longitudinal drive grooves, drive balls in the drive grooves for transferring torque between the drive members and a cage for positioning the drive balls which is pivoted on the inner and outer drive members about two respective centers which are on opposite sides of and spaced from the cage center, the improvement comprising the cage having an inside surface comprising a cylindrical surface and partispherical surfaces at the respective ends of the cylindrical surface, each of said partispherical surfaces have a diameter substantially equal to the diameter of the cylindrical surface, and a center which lies on the axis of the cage spaced from the cage center and on a side opposite the center about which the cage pivots on the outer member, said inner member slideably engaging the inside surface of the cage and being moveable axially and pivotally with respect to the cage between end positions where a partispherical outer surface of the inner drive member engages one or the other of the partispherical surfaces inside the cage.

* * * * *

UNITED STATES PATENT AND TRADEMARK OFFICE
CERTIFICATE OF CORRECTION

PATENT NO. : BI 4,385,899
DATED : November 22, 1988
INVENTOR(S) : Leonard N. Franklin Jr.

It is certified that error appears in the above-identified patent and that said Letters Patent is hereby corrected as shown below:

On the title page, Item [45] "Nov. 15, 1988" should read

-- Nov. 22, 1988 --.

Signed and Sealed this

Sixth Day of December, 1988

Attest:

DONALD J. QUIGG

*Attesting Officer*

*Commissioner of Patents and Trademarks*

REEXAMINATION CERTIFICATE (949th)
United States Patent [19]
Franklin, Jr.

[11] B1 4,385,899
[45] Certificate Issued  Nov. 15, 1988

[54] UNIVERSAL JOINT

[75] Inventor: Leonard N. Franklin, Jr., Reese, Mich.

[73] Assignee: General Motors Corporation, Detroit, Mich.

Reexamination Request:
No. 90/001,463, Mar. 7, 1988

Reexamination Certificate for:
Patent No.: 4,385,899
Issued: May 31, 1983
Appl. No.: 182,865
Filed: Sep. 2, 1980

[51] Int. Cl.⁴ .............................................. F16D 3/02
[52] U.S. Cl. ................................. 464/146; 464/906

[56] References Cited
FOREIGN PATENT DOCUMENTS
61-14365  4/1986  Japan .

*Primary Examiner*—Daniel P. Stodola

[57] ABSTRACT

A universal joint comprises inner and outer drive members with longitudinal drive grooves which receive drive balls for transferring torque between the members. The balls are positioned by a cage which is pivoted on the inner and outer drive members about two respective centers which are on opposite sides of and spaced from the cage center. The cage has a cylindrical surface and two stop surfaces inside the cage which permits the inner drive member to slide and pivot with respect to the cage for limited distance which in turn provides either a limited plunge or a limited plunge of reduced resistance.

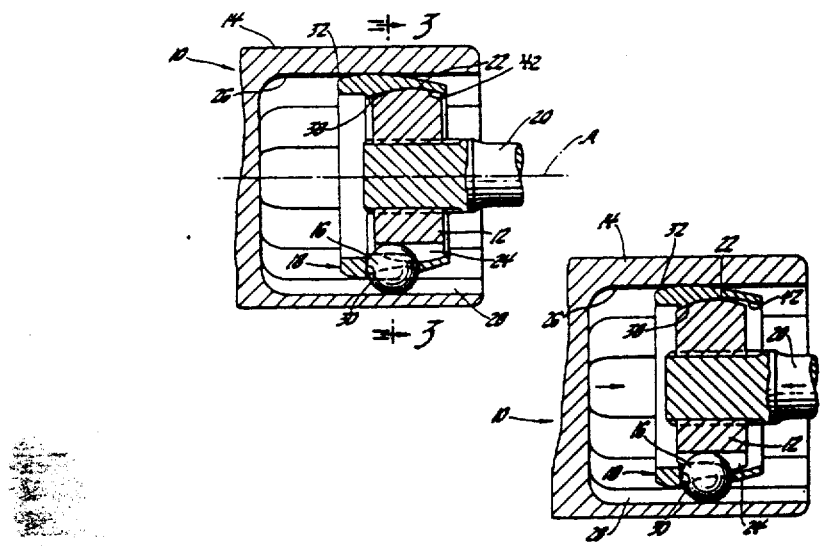

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *